United States Patent [19]

Hertel et al.

[11] Patent Number: 4,696,675
[45] Date of Patent: Sep. 29, 1987

[54] PROCESS FOR PREPARING WATER-INSOLUBLE BLUE AZO DYES ON THE FIBER: HYDROXYNAPHTHOIC AMIDE AND DIAZOTIZED DI-ALKOXY-BENZIDINE

[75] Inventors: Hasso Hertel, Mühlheim am Main; Klaus Hunger, Kelkheim; Heinrich Frölich, Niedernhausen, all of Fed. Rep. of Germany

[73] Assignee: Hoechst Aktiengesellschaft, Fed. Rep. of Germany

[21] Appl. No.: 845,623

[22] Filed: Mar. 27, 1986

[30] Foreign Application Priority Data

Mar. 29, 1985 [DE] Fed. Rep. of Germany ....... 3511543

[51] Int. Cl.⁴ .................... C09B 35/02; D06P 1/12; D06P 3/68
[52] U.S. Cl. ............................ 8/669; 8/666; 8/687; 8/696; 8/918
[58] Field of Search ..................... 8/669, 666

[56] References Cited

PUBLICATIONS

*Colour Index*, vol. 4, Society of Dyers and Colourists, 1972, pp. 4351, 4352, 4354, 4355.

*Primary Examiner*—A. Lionel Clingman
*Attorney, Agent, or Firm*—Connolly and Hutz

[57] ABSTRACT

Using the method of azoic dyeing, fast blue dyeings are obtained when the bis-diazotable diazo component used is a compound of the general formula (1)

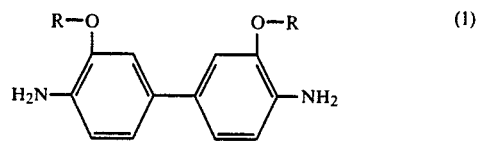

in which R is a straight-chain or branched alkyl group of 3 to 5 carbon atoms or a $(C_1-C_3)$-alkoxy-$(C_2-C_4)$-alkyl group having straight-chain and/or branched alkyl groups of in total 3 to 5 carbon atoms, and the coupling component used is a compound conforming to the general formula (2)

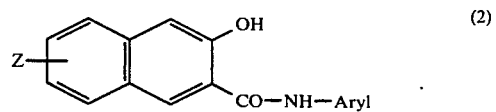

in which Z stands for a hydrogen atom or a halogen atom or an alkoxy group of 1 to 4 carbon atoms and Aryl denotes a phenyl radical or a 1-naphthyl radical which can be substituted by 1, 2 or 3 substituents from the group consisting of halogen, nitro, alkyl of 1 to 4 carbon atoms and alkoxy of 1 to 4 carbon atoms, and the coupling reaction and dye formation on the fiber are carried out at a pH value between 4 and 10.

22 Claims, No Drawings

PROCESS FOR PREPARING WATER-INSOLUBLE BLUE AZO DYES ON THE FIBER: HYDROXYNAPHTHOIC AMIDE AND DIAZOTIZED DI-ALKOXY-BENZIDINE

The invention is in the technical field of azoic dyeing.

There are a large number of ways to prepare blue azo dyes on the fiber using the methods of azoic dyeing by reacting a diazo component with a coupling component on the fiber. Of practical importance is in particular the production of dyes using a coupling component from the N-aryl-2-hydroxynaphthalene-3-carboxamide series and using the diazo components given by the Colour Index as C.I. Azoic Diazo Component 20 [N-(4-amino-2,5-diethoxy-phenyl)-benzamide], C.I. Azoic Diazo Component 22 [4-aminodiphenylamine], C.I. Azoic Diazo Component 24 [N-(4-amino-2,5-dimethoxy-phenyl)-benzamide], C.I. Azoic Diazo Component 35 [4'-amino-4-methoxydiphenylamine], C.I. Diazo Component 47 [4-amino-3-methoxydiphenylamine] and C.I. Azoic Diazo Component 48 [4,4'-diamino-3,3'-dimethoxydiphenyl]. Methods of azoic dyeing for those components are described for example in H. Rath, Lehrbuch der Textilchemie [Textbook of textile chemistry], 3rd edition, pages 548 et seq., Springer-Verlag (1972), and in Melliand Textilberichte 30, 525-528 (1949).

It has now been found that it is possible to prepare on the fibe azoic dyeings having better wet fastness properties using as a bis-diazotizable diazo component 4,4'-diamino-3,3'-dialkoxybiphenyl having alkoxy groups of 3 to 5 carbon atoms or a 4,4'-diamino-3,3'-di[($C_1$–$C_3$)-alkoxy-($C_2$–$C_4$)-alkoxy]-biphenyl having alkoxyalkoxy groups of in total 3 to 5 C-atoms for each alkoxyalkoxy group.

The present invention thus relates to a process for preparing water-insoluble disazo dyes on the fiber, in particular on the cellulose fiber, using azoic dyeing methods, by bringing the fiber material after impregnating with a coupling component into contact with a diazonium compound of an aromatic amine in an aqueous medium and coupling, which comprises using as a bis-diazotizable diazo component a compound of the general formula (1)

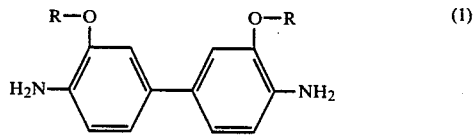

in which R is a straight-chain or branched alkyl group of 3 to 5 carbon atoms or a ($C_1$–$C_3$)-alkoxy-($C_2$–$C_4$)-alkyl group having straight-chain and/or branched alkyl groups of in total 3 to 5 carbon atoms, and as the coupling component a compound conforming to the general formula (2)

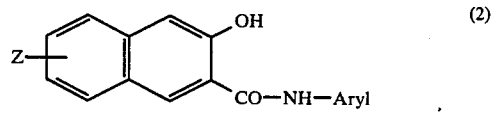

in which Z is preferably bonded in the 6- or 7-position and stands for a hydrogen atom or a halogen atom, such as a bromine atom, or an alkoxy group of 1 to 4 carbon atoms, such as the methoxy or ethoxy group, and Aryl denotes a phenyl radical or a 1-naphthyl radical which may both be substituted by 1, 2 or 3 substituents from the group consisting of halogen, such as bromine and in particular chlorine, nitro, alkyl of 1 to 4 carbon atoms, such as ethyl and in particular methyl, and alkoxy of 1 to 4 carbon atoms, such as ethoxy and in particular methoxy, and performing a coupling reaction and dye formation on the fiber at a pH value between 4 and 10, preferably between 6 and 9.

Diaminobiphenyl compounds of the general formula (1) are for example: 4,4'-diamino-3,3'-bis-(1-methylethoxy)-biphenyl, 4,4'-diamino-3,3'-dibutoxybiphenyl, 4,4'-diamino-3,3'-bis-(1-methylpropoxy)-biphenyl, 4,4'-diamino-3,3'-bis-(2-methylpropoxy)-biphenyl, 4,4'-diamino-3,3'-bis-(1,1-dimethylethoxy)-biphenyl, 4,4'-diamino-3,3'-dipentoxybiphenyl, 4,4'-diamino-3,3'-bis-(3-methylbutoxy)-biphenyl, 4,4'-diamino-3,3'-bis-(2-methoxyethoxy)-biphenyl and 4,4'-diamino-3,3'-bis-(2-ethoxyethoxy)-biphenyl.

Coupling components of the general formula (2) are for example: the phenylamide, the 2-methylphenylamide, the 2-ethylphenylamide, the 2-methoxyphenylamide, the 4-methoxyphenylamide, the 2-ethoxyphenylamide, the 4-chlorophenylamide, the 4-chloro-2-methylphenylamide, the 3-nitrophenylamide, the 5-chloro-2-methoxyphenylamide, the 4-methoxy-2-methylphenylamide, the 2,5-dimethoxyphenylamide, the 5-chloro-2,4-dimethoxyphenylamide, the 4-chloro-2,5-dimethoxyphenylamide, the 4-chloro-2-methoxy-5-methylphenylamide, the 5-bromo-2-methoxyphenylamide and the naphth-1-ylamide of 2-hydroxynaphthalene-3-carboxylic acid, N-2-methoxyphenyl-6-bromo-2-hydroxynaphthalene-3-carboxamide, N-phenyl-6-methoxy-2-hydroxynaphthalene-3-carboxamide and N-(4-chloro-2,5-dimethoxyphenyl)-6-methoxy-2-hydroxynaphthalene-3-carboxamide.

The two radicals R are preferably identical to each other. R is for example an n-propyl, isopropyl, n-butyl, isobutyl, sec.-butyl, tert.-butyl, 2-methoxyethyl, 2-methoxy-n-propyl, 3-methoxy-n-propyl, 2-methoxyisopropyl, 2-ethoxyethyl, n-pentyl or isopentyl group.

Particularly preferably R is an n-propyl, n-butyl, iso-propyl, 2-methoxyethyl and 2-ethoxyethyl group.

Preferably Aryl denotes the phenyl, 2-methoxyphenyl, 2-methoxyphenyl, 4-methoxyphenyl, 2-ethoxyphenyl, 4-ethoxyphenyl, 4-methoxy-2-methylphenyl, 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl and the 1-naphthyl radical.

The disazo dyes are formed from the components conforming to the general formulae (1) and (2) using the techniques of azoic dyeing, which has been extensively described in the literature (see, for example, K. Venkataraman, The Chemistry of Synthetic Dyes, Vol. I. p. 650-704, in particular p. 668-672, Academic Press New York (1952)). To this end, fiber material, in particular a cellulose fiber material, which has been preimpregnated beforehand with the coupling component conforming to the general formula (2) under alkaline conditions is brought into contact in aqueous medium with a bis-diazonium salt of the diamino compound conforming to the general formula (1). This can be done in general by proceeding analogously to customary methods of azoic dyeing and bringing the material which has been primed with an alkaline aqueous solution of the coupling component together with a separately prepared aqueous solution of the bisdiazonium salt which contains sufficient acidic agents and/or buffer substances as to establish a pH in the range between 4 and 10, preferably between 6 and 9, and for the coupling reaction then to take place within this pH range. However, it is also possible to bis-diazotize the diaminobiphenyl compound in an aqueous medium in the presence of the impregnated material and to carry out the coupling reaction simultaneously or subsequently; in this variant, either the diazotization is carried out in a weakly acid medium or subsequently to the diazotization the pH is brought to a value which is favorable for the coupling reaction between 4 and 10.

For all these forms of carrying out the process, the amount of acid to be used in the diazotization and/or the amount of alkali in the impregnated material or in the aqueous medium in which the impregnated material to be dyed is present are advantageously apportioned beforehand in such a way that, if necessary through addition of buffer substances or buffer mixtures, the desired pH value for the coupling to be carried out can become established immediately.

The bis-diazotization of the compounds (1) and also their coupling reaction with the compounds (2) is effected at the temperatures customary in azoic dyeing, thus for example at a temperature between 0° and 35° C.

In detail a possible procedure is for example as follows: The diaminobiphenyl compound is diazotized by means of an aqueous sodium nitrite solution, preferably in dilute aqueous hydrochloric acid; thereafter excess mineral acid is bound by means of an acid-binding agent, such as, for example, sodium acetate, sodium bicarbonate or sodium phosphate, and the aqueous bis-diazonium salt solution is subsequently, if desired after addition of an alkali-binding agent, such as acetic acid, sodium dihydrogenphosphate, boric acid or chromium acetate, used as a dyeing liquor or dyebath. This liquor bath can be applied by means of a pad-mangle to the material to be dyed, here in particular fabric, which has been impregnated beforehand with the alkali metal salt of the coupling component conforming to the general formula (2) and dried. This liquor can also be used by entering the impregnated material to be dyed in the form of a fabric or in the form of threads or yarns into this aqueous bis-diazonium salt solution as dyebath and agitating it therein, whether by hand or by means of or in corresponding apparatus customary in the art, such as reel beck, jigger or jet machine. Herein the requisite coupling range between 4 and 10 is established and maintained by means of appropriate acid-binding or alkali-binding agents or buffer substances.

Another way of forming the dye can take the form of a printing process in which the aqueous solution of the bisdiazonium salt is thickened with a suitable agent customary in the art, such as starch, tragacanth, a cellulose ether or cellulose ester, and a fabric which has been impregnated with the alkali metal salt of the coupling component is printed with this thickened solution, while here too an appropriate coupling pH value between 4 and 10 is established and maintained by appopriate choice of acid-binding or alkali-binding agents or buffer substances, respectively by appropriate choice of their amounts.

In another version of the process according to the invention for preparing disazo dyes using the above-mentioned components (1) and (2) on the fiber, the fabric to be dyed, which has been impregnated beforehand with the alkali metal salt of the coupling component and sodium nitrite, is printed with a solution or dispersion of the diaminobiphenyl of the general formula (1) which has been thickened and additionally contains a weak or medium acid.

The dyed material is then, as customary in azoic dyeing, finished by thorough rinsing with water, alkaline soapoff, further rinsing with water and drying. The dyeings obtainable according to the invention have good fastness properties, in particular very good wet fastness properties, of which in particular the wash fastness properties at various temperatures, the peroxide wash fastness, fastness to soda boiling, mercerization fastness, bleach, dry cleaning and rub fastness are noteworthy.

The coupling components of the general formula (2) are extensively described in the literature. Similarly, some of the diaminobiphenyl compounds of the general formula (1) are known from the literature (see Chem. Abstracts, 55, 23435 g). Those of the aminobiphenyl compounds of the general formula (1) which are new can be prepared analogously to the known compounds, for instance in general in accordance with the methods for synthesizing benzidine compounds, such as by reduction of the corresponding 2-nitroalkoxybenzene or 2-nitro-(alkoxyalkoxy)-benzene compound in an alkaline medium to give the corresponding di-(alkoxypheyl)- or di-(alkoxyalkoxy-phenyl)-hydrazine compound, which is then rearranged in a strongly acid medium to give the corresponding 4,4'-diamino-3,3'-dialkoxy or -di-(alkoxyalkoxy)-biphenyl compound.

The examples below serve to illustrate the invention. The parts and percentages mentioned therein are by weight unless otherwise stated.

EXAMPLE 1

(a) A cotton fabric is first impregnated with a coupling component by padding it with an aqueous liquor comprising an aqueous solution of 12.5 parts of the phenylamide of 2-hydroxynaphthalene-3-carboxylic acid, 17 parts of aqueous 32% strength sodium hydroxide solution and 5 parts of a commercially available dyeing and leveling assistant based on a fatty acid/-protein degradation product condensation product in 1000 parts of water, with a liquor pickup of 80% on weight of fiber.

(b) In a separate operation, a developing bath is prepared with the bisdiazonium salt by adding 30 parts of a solution comprising 33% of 4,4'-diamino-3,3'-di-(n-butoxy)-biphenyl which has a melting point of 75° C., 52% of N-methylpyrrolidone and 15% of an addition product of castor oil and 30 mol of ethylene oxide, to a warm mixture at 20° C. of 350 parts of water and 21 parts of 32% strength aqueous hydrochloric acid with thorough stirring. While the thorough stirring is continued, the bis-diazotization is then effected by gradual addition of 4.7 parts of sodium nitrite in the form of a concentrated aqueous solution. After about 10 minutes excess acid is bound by 5 parts of sodium hydrogencarbonate. 13 parts of boric acid are added and the solution is bulked to 1000 parts with water.

(c) The fabric which has been pad-mangled under (a) and then dried is overpadded at room temperature in a second pad-mangle with the developing bath described under (b) with a liquor pickup of 80%. After passing through air for about a minute, the overpadded fabric is passed through hot water and is then conventionally aftertreated and finished by rinsing in cold and hot water, by hot soaping, rinsing in hot and cold water and drying.

The result obtained is blue dyeing having a high color yield and high fastness properties, in particular high rub fastness properties and very high wash fastness properties.

EXAMPLE 2

To prepare a blue dyeing on cotton the procedure of Example 1 is followed, except that the developing bath used there is replaced by a developing bath which has been prepared in the same way as in Example 1 (b) using, however, 4,4'-diamino-3,3'-bis-(1-methyl-n-propoxy)-biphenyl in a equivalent amount.

The result obtained is a blue dyeing in high color yield and high fastness properties, such as in particular high wash fastness properties.

EXAMPLE 3

To prepare a blue dyeing on cotton the procedure of Example 1 is followed, except that the developing bath used there is replaced by an aqueous liquor which has been obtained in correspondence to the manner described in Ex. 1(b) by bis-di-azotizing 30 parts of a solution containing 30% of 4,4'-diamino-3,3'-bis-(1-methylethoxy)-biphenyl, 15% of an addition product of castor oil and about 36 mol of ethylene oxide and 55% of methyldiglycol.

The blue cotton dyeing is obtained in high color yield and in high fastness properties, in particular high wash and peroxide wash fastness properties.

EXAMPLE 4

(a) First the following impregnating liquor is prepared: 8 parts of the 4-chloro-2-methylphenylamide of 2-hydroxynaphthalene-3-carboxylic acid are pasted up with 13 parts of ethanol and are dissolved by adding 5.5 parts of 32% strength aqueous sodium hydroxide solution and 16 parts of water at 40° C. 8 parts of 33% strength aqueous formaldehyde solution are added, and the stock solution thus prepared is stirred after 10 minutes into a warm solution at 35° C. of 44 parts of a 32% strength aqueous sodium hydroxide solution, 120 parts of sodium chloride and 18 parts of a commercially available fatty acid/protein degradation product condensation product in 6000 parts of soft water. This impregnating liquor is pumped in a cheese dyeing apparatus through a cheese holding 600 parts of cotton yarn which, to remove interfering non-cellulose substances, has been boiled in an alkaline bath containing a surfactant and sequesterant, for 30 minutes. The impregnating liquor is then dropped, and the impregnated cheese is rinsed for 10 minutes with a solution of 240 parts of sodium chloride and 4 parts of 32% strength aqueous sodium hydroxide solution in 6000 parts of water. The rinse bath is subsequently dropped.

(b) The cheese dyeing apparatus is then supplied with a developing liquor which is prepared as follows: 6 parts of 4,4'-diamino-3,3'-bis-(1-methylethoxy)-biphenyl dichlorohydrate are stirred with thorough stirring into a mixture of 50 parts of water and 8.5 parts of 32% strength hydrochloric acid. About 20 parts of ice are added, and the diaminobiphenyl compound is bis-diazotized with thorough stirring by gradual addition of 2.6 parts of sodium nitrite in concentrated aqueous solution. Stirring is continued for 30 minutes, and this stock solution is then poured into a solution of 17 parts of sodium dihydrogenphosphate dihydrate, 60 parts of disodium hydrogenphosphate dodecahydrate and 12 parts of an octadecyl alcohol polyglycol ether in 6000 parts of water. This developing liquor is pumped at 20° C. through the impregnated cheese for 30 minutes and is then discharged from the apparatus. The cheese is then rinsed in conventional manner with an aqueous acetic acid solution, is then rinsed with cold water until clear and is then soaped off first at 60° C. and then at 100° C. and is subsequently rinsed with warm and cold water and finally dried.

The result obtained is a blue cotton dyeing in a high color yield and high fastness properties, such as in particular wash fastness properties.

EXAMPLE 5

(a) To 2.8 parts of the naphth-1-ylamide of 2-hydroxynaphthalene-3-carboxylic acid is added a mixture of 4 parts of ethanol, 4 parts of water, 2 parts of 32% strength aqueous sodium hydroxide solution and 2 parts of 33% strength aqueous formaldehyde solution, which is followed by stirring to effect solution. After about 10 minutes this solution is added to 1000 parts of water which contain 8.5 parts of 32% strength aqueous sodium hydroxide solution and 2 parts of a fatty acid/-protein degradation product condensation product in solution. To the bath thus prepared are added 50 parts of a bleached, boiled-off and prewetted cotton yarn and agitated therein for 30 minutes. The yarn is then removed and rinsed in a solution of 30 parts of sodium chloride and 1.3 parts of 32% strength sodium hydroxide solution in 1000 parts of water.

(b) In a separate operation, the developing bath with the bisdiazonium salt of 4,4'-diamino-3,3'-di-(n-butoxy)-biphenyl is prepared as follows: 1.35 parts of this biphenyl compound are dissolved in a hot mixture of 30 parts of water and 2.4 parts of aqueous 32% strength hydrochloric acid. The solution is cooled, 10 parts of ice are added, and a bisdiazotization is then carried out with 0.58 parts of sodium nitrite in concentrated aqueous solution. After the diazotization has ended excess acid is bound with sodium hydrogen carbonate (about 1 part), the solution is then diluted to 1000 parts with water and 5 parts of chromium(III) acetate in 1 part of an alkyl polyglycol either are dissolved therein.

(c) To prepare the dyeing on the textile material the procedure used is for example as follows: The fabric which has been impregnated and rinsed as per (a) is introduced into the developing bath described under (b) and is treated therein at a temperature of about 20° C. for 30 minutes. The material is then removed and, as customary, rinsed, soaped, rinsed once more and dried.

The result obtained is a blue dyeing in high color yield having high fastness properties, in particular very high wash fastness properties.

EXAMPLE 6

To prepare a blue dyeing the procedure of Example 5 can be followed and a bisdiazonium salt also be used in the form of a crystalline chlorozincate salt as per section (a) below or in the form of a preparation of this chlorozincate salt for preparing a developing bath:

(a) 328 pats of 4,4'-diamino-3,3'-di-(n-butoxy)-biphenyl are thoroughly stirred in 600 parts of water. 260 parts of aqueous 32% strength hydrochloric acid are gradually added; the result is a pasty suspension of the chlorhydrate, which is subsequently stirred for a further hour. To complete the chlorhydrate formation, a further 320 parts of 32% strength aqueous hydrochloric acid are then added. The suspension is cooled down to about 20° C., and 370 parts of 40% strength aqueous sodium nitrite solution are added in such a way that nitrite or nitrous acid are each present only in slight excess, if at all. Herein the reaction temperature rises to 30° to 35° C.; it is maintained at 30° to 35° C. until the end of the diazotization reaction. After the diazotization reaction has ended, however, a distinct excess of nitrite should be present. The resulting solution of bis-diazonium salt is treated while cooling down with 10 parts of clarified carbon for about 5 minutes. A spot test on a filter paper is used to test whether the runoff is pure yellow; in this case the batch is stirred with 10 parts of kieselguhr and is then filtered with suction (if the runoff is still brown, more clarifying carbon needs to be added). The residue is washed with a little water. To the combined filtrates are gradually added with stirring and gradual cooling down to about 15° C. 450 parts of 33% strength aqueous zinc hloride solution. The 3,3'-di-(n-butoxy)-biphenyl-4,4'-bis-(diazonium)tetrachlorozincate crystallizes out in attractive yellow crystals. 250 parts of sodium chloride are added to complete the precipitation. The bis-diazonium salt is filtered off with suction and is centrifuged to remove the bulk of the adherent mother liquor. The residual moisture content is still about 8%.

(b) The bis-diazonium salt prepared under (a) can, after mixing with about 450 parts of sodium sulfate and subsequent drying or even advantageously in the form of the composition described hereinafter, be used in the process according to the invention for preparing a disazo dye on the fiber. To prepare the composition, the moist diazonium salt obtained under (a) is mixed in a mixer which has an acid-resistant lining and a cooling jacket, with 50 parts of aluminum sulfate hexahydrate, 130 parts of magnesium sulfate monohydrate and 380 parts of sodium sulfate by presenting the inorganic salts and adding the moist diazonium salt a little at a time. The resulting heat of hydration is dissipated by external cooling. After the content of the bis-diazonium salt in the composition has been determined, further sodium sulfate is added up to a certain strength, for example up to a bis-diazonium salt content of 20%, based on a molecular weight of 328 for the diaminobiphenyl compound. In this way a stable dyeing composition is obtained.

(c) The developing bath used for preparing the disazo dye on the textile material is prepared by dissolving 6.75 parts of the composition described in section (b), 5 parts of chromium(III) acetate and 1 part of an alkyl polyglycol ether in 1000 parts of water.

In accordance with Example 5, a blue dyeing is obtained in a color yield and with fastness properties as high as those of the dyeing obtained in accordance with Example 1 or 5.

EXAMPLE 7

To prepare a cotton dyeing using 4,4'-diamino-3,3'-bis-(2-methoxyethoxy)-biphenyl as a bisdiazo component, it is possible to follow the method indicated in Example 5 by using in the preparation of the developing liquor not the diaminodibutoxybiphenyl used there but the diamino-bis-(methoxyethoxy)-biphenyl specified here.

The result obtained is a blue cotton dyeing in high color yield and high fastness properties, such as in particular drycleaning fastness properties.

EXAMPLE 8

The dyeing is carried out on a jigger:

(a) To this end, the first step is to prepare the following stock solution for the impregnating liquor: 3.5 parts of the 4'-chloro-2,5-dimethoxyphenylamide of 2-hydroxynaphthalene-3-carboxylic acid are pasted up with 4.3 parts of ethanol. 1.9 parts of 32% strength aqueous sodium hydroxide solution are added, followed by the addition of 7 parts of water at 40° C. with stirring. To this solution are added 2.5 parts of 33% strength aqueous formaldehyde solution.

(b) 330 parts of a cotton fabric are treated at 20° C. for about 40 minutes in an impregnating liquor comprising the stock solution prepared under (a) and a solution of 6.3 parts of 32% strength aqueous sodium hydroxide solution and 5 parts of a fatty acid/protein degradation product condensation product in 980 parts of water. To this end, the trough of a jigger is charged first with the alkaline solution of the condensation product in 980 parts of water, half of the stock solution prepared above under (a) is stirred in, and the cotton fabric is initially treated in the jigger with this liquor for the duration of one pass; to the jigger liquor is then added, after the first pass of the fabric, a second half of the above stock solution, and the fabric is further treated with this liquor in the jigger as indicated. After the impregnation has ended, the liquor is discharged from the jigger.

(c) The trough is filled with a developing liquor which is prepared as follows: 8 parts of aqueous organic 4,4'-diamino-3,3'-dibutoxybiphenyl solution described in Example 1 (b) are stirred into a warm mixture at 20° C. of 100 parts of water and 4.6 parts of 32% strength aqueous hydrochloric acid; in this solution the diaminobiphenyl is bis-diazotized with stirring by addition of 1.2 parts of sodium nitrite in the form of a concentrated aqueous solution. After about 10 minutes excess acid is bound with about 0.5 part of sodium hydrogencarbonate, 5 parts of boric acid are then added, and the whole is bulked with water to 1000 parts. The impregnated fabric is treated with this developing liquor in the jigger for about 30 minutes, is then removed and is conventionally aftertreated and finished.

The cotton fabric is obtained in a muted blue dyeing which hs high fastness properties.

EXAMPLE 9

To prepare a blue print pattern the procedure used is for example as follows: A cotton fabric is impregnated with the phenylamide of 2-hydroxynaphthalene-3-carboxylic acid in accordance with the directions of Example 1 (a), is dried and is printed on a screen or roller printing machine with a print paste which is prepared as follows: 30 parts of the organic diaminodibutoxybiphenyl solution described in Example 1 (b) are added to a warm mixture at 20° C. of 350 parts of water and 18 parts of 32% strength aqueous hydrochloric acid with thorough stirring; the diaminobiphenyl is then bisdiazotized with further thorough stirring by addition of 4.7 parts of sodium nitrite in the form of a concentrated aqueous solution. Stirring is continued for a further 10 minutes, and to the resulting bisdiazonium salt solution are added 9 parts of crystalline sodium acetate and 7.5 parts of acetic acid, and the whole is bulked to 1000 parts with a print thickening and water.

The fabric printed with this print paste is aftertreated and finished in conventional manner as for example mentioned in the preceding examples. The result obtained is a deep blue print pattern having high fastness properties which correspond to those of the dyeing obtainable as per Example 1.

EXAMPLE 10

To prepare a blue dyeing the procedure indicated in Example 1 is followed, except that the coupling component used is an equivalent amount of the 2-methylphenylamide of 2-hydroxynaphthalene-3-carboxylic acid. The result is likewise a blue cotton dyeing in high color yield having high fastness properties, such as, for example, highwash and rub fastness properties.

EXAMPLE 11

To prepare a blue dyeing the procedure indicated in Example 2 is followed, except that the coupling component used in an equivalent amount of the 2-methylphenylamide of 2-hydroxynaphthalene-3-carboxylic acid. The result is likewise a blue cotton dyeing in high color yield having high fastness properties, such as, for example, high soda fastness.

EXAMPLE 12

To prepare a blue dyeing the procedure indicated in Example 3 is followed, except that the coupling component used is an equivalent amount of the 2-methylphenylamide of 2-hydroxynaphthalene-3-carboxylic acid. The result is likewise a blue cotton dyeing in high color yield having high fastness properties, such as, for example, high peroxide wash fastness properties.

EXAMPLE 13

To prepare a blue dyeing the procedure indicated in Example 5 or 6 is followed, except that the coupling component used is an equivalent amount of 5-chloro-2-methoxyphenylamide of 2-hydroxynaphthalene-3-carboxylic acid. The result obtained is likewise a deep blue dyeing having high fastness properties, such as, in particular, high wash fastness properties.

EXAMPLE 14

To prepare a blue dyeing the procedure indicated in Example 7 is followed, except that the coupling component used is an equivalent amount of the 5-chloro-2-methoxyphenylamide of 2-hydroxynaphthalene-3-carboxyic acid. The result is likewise a deep blue dyeing having high fastness properties, such as, in particular, high wash fastness properties.

EXAMPLE 15

To prepare a blue dyeing the procedure indicated in Example 5 or 6 is followed, except that the coupling component used is an equivalent amount of the 4-chloro-2-methylphenylamide of 2-hydroxynaphthalene-3-carboxylic acid. The result is likewise a deep blue dyeing having high fastness properties, such as, in particular, high dry cleaning fastness properties.

EXAMPLE 16

To prepare a blue dyeing the procedure indicated in Example 7 is followed, except that the coupling component used is an equivalent amount of the 4-chloro-2-methylphenylamide of 2-hydroxynaphthalene-3-carboxylic acid. The result is likewise a deep blue dyeing having high fastness properties, such as, in particular, high wash fastness properties.

EXAMPLE 17

To prepare a blue print pattern the procedure followed is for example as follows: A cotton fabric is impregnated with the phenylaide of 2-hydroxynaphthalene-3-carboxylic acid in accordance with the directions of Example 1 (a), except that the solution additionally contains 20 parts of sodium nitrite, and the fabric is dried and printed on a screen or roller printing machine with a print paste prepared as follows: 400 parts of a customary print thickening are diluted with 400 parts of water, and 40 parts of a 90% strength aqueous lactic acid solution, 10 parts of acetic acid and 30 parts of the organic diaminodibutoxybiphenyl solution described in Example 1 (b) are stirred in in succession; this is followed by dilution with water or print thickening to 1000 parts. The printed fabric is, as customary, dried with hot air and aftertreated and finished as mentioned in the preceding examples.

The result obtained is a deep blue print pattern having high fastness properties, of which in particular the high wash and rub fastness properties are noteworthy.

We claim:

1. A process for preparing a water-insoluble disazo dye on a fiber, according to an azoic dyeing method, by bringing the fiber material, after its impregnation with a coupling component, into contact with the diazonium compound of an aromatic diamine in aqueous medium and coupling that bis-diazonium compound with the coupling component, which process comprises using as a bis-diazotizable diazo component a compound of the formula

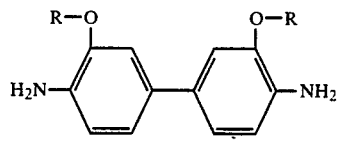

in which R is a straight-chain or branched alkyl of 3 to 5 carbon atoms or a $(C_1-C_3)$-alkoxy-$(C_2-C_4)$-alkyl having straight-chain and/or branched alkyls of in total 3 to 5 carbon atoms, and as the coupling component a compound of the formula

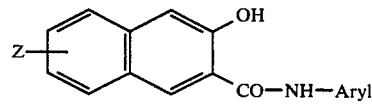

in which Z is hydrogen, halogen or alkoxy of 1 to 4 carbon atoms, and aryl is phenyl or 1-naphthyl, or phenyl or 1-naphthyl substituted by 1, 2 or 3 substituents selected from the group consisting of halogen, nitro, alkyl of 1 to 4 carbon atoms and alkoxy of 1 to 4 carbon atoms, and carrying out the coupling reaction and dye formation on the fiber at a pH of between 4 and 10.

2. In a process for coloring a fiber material, accrding to an azoic dyeing method, wherein the fiber material is impregnated with a coupling component corresponding to the formula

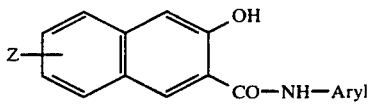

in which Z is hydrogen, halogen or alkoxy of 1 to 4 carbon atoms, and aryl is phenyl or 1-naphthyl, or phenyl or 1-naphthyl substituted by 1, 2 or 3 substituents selected from the group consisting of halogen, nitro, alkyl of 1 to 4 carbon atoms and alkoxy of 1 to 4 carbon atoms, and the impregnated material is brought in contact, in aqueous medium, with the bis-diazonium compound of an aromatic diamine, and the coupling reaction and dye formation on the fiber is carried out at a pH of from 4 to 10, the improvement comprising of employing as the bis-diazonium compound that of a diamino-biphenyl compound of the formula

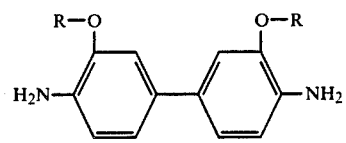

in which R is a straight-chain or branched alkyl of 3 to 5 carbon atoms or a ($C_1$–$C_3$)-alkoxy-($C_2$–$C_4$)-alkyl having straight-chain and/or branched alkyls of in total 3 to 5 carbon atoms.

3. The process according to claim 1, wherein the coupling reaction and dye formation is carried out at a pH value between 6 and 9.

4. The process according to claim 1, wherein, in the coupling component employed, the substituent Z is bonded in the 6- or 7-position.

5. The process according to claim 1, wherein, in the coupling component employed, the substituent Z is hydrogen.

6. The process according to claim 1, wherein, in the diaminobiphenyl compound employed, each R is a propyl.

7. The process according to claim 1, wherein, in the diaminobiphenyl compound employed, each R is a butyl.

8. The process according to claim 1, wherein, in the diaminobiphenyl compound employed, each R is n-butyl.

9. The process according to claim 1, wherein, in the diaminobiphenyl compound employed, each R is 2-methoxyethoxy.

10. The process according to claim 1, wherein, in the diaminobiphenyl compiound employed, each R is 2-ethoxyethoxy.

11. The process according to claim 1, wherein, in the coupling component employed, aryl is phenyl, 2-methylphenyl, 2-methoxyphenyl, 4-methoxyphenyl, 2-ethoxyphenyl, 4-ethoxyphenyl, 4-methoxy-2-methylphenyl, 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl or 1-naphthyl.

12. The process according to claim 2, wherein the coupling reaction and dye formation is carried out at a pH value between 6 and 9.

13. The process according to claim 2, wherein, in the coupling component employed, the substituent Z is bonded in the 6- or 7-position.

14. The process according to claim 2, wherein, in the coupling component employed, the substituent Z is hydrogen.

15. The process according to claim 2, wherein, in the diaminobiphenyl compound employed, each R is a propyl.

16. The process according to claim 2, wherein, in the diaminobiphenyl compound employed, each R is a butyl.

17. The process according to claim 2, wherein, in the diaminobiphenyl compound employed, each R is n-butyl.

18. The process according to claim 2, wherein, in the diaminobiphenyl compound employed, each R is 2-methoxyethoxy.

19. The process according to claim 2, wherein, in the diaminobiphenyl compound employed, each R is 2-ethoxyethoxy.

20. The process according to claim 2, wherein, in the coupling component employed, aryl is phenyl, 2-methylphenyl, 2-methoxyphenyl, 4-methoxyphenyl, 2-ethoxyphenyl, 4-ethoxyphenyl, 4-methoxy-2-methylphenyl, 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl or 1-naphthyl.

21. The process according to claim 1, wherein the fiber is cellulose fiber.

22. The process according to claim 2, wherein the fiber material is cellulose fiber.

* * * * *